United States Patent
Jeran

(10) Patent No.: US 7,551,321 B2
(45) Date of Patent: *Jun. 23, 2009

(54) PRINTING WITH CUSTOM COLORANT MATERIALS

(75) Inventor: Paul L Jeran, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/773,100

(22) Filed: Jul. 3, 2007

(65) Prior Publication Data

US 2008/0013117 A1    Jan. 17, 2008

Related U.S. Application Data

(63) Continuation of application No. 10/175,878, filed on Jun. 21, 2002, now Pat. No. 7,259,890.

(51) Int. Cl.
*H04N 1/60* (2006.01)
*G06K 15/00* (2006.01)
*G06K 9/00* (2006.01)

(52) U.S. Cl. .................. 358/1.9; 358/3.23; 358/1.16; 358/515; 358/523; 358/501; 382/162; 382/167

(58) Field of Classification Search .................. 358/1.9, 358/518, 3.23, 1.16, 515, 523, 501; 399/234, 399/223, 272; 382/162, 167; 106/31.14, 106/31.15; 283/74; 347/100, 20, 98; 427/7
See application file for complete search history.

(56) References Cited

U.S. PATENT DOCUMENTS

| 4,699,079 | A | * | 10/1987 | Palm et al. ................. 399/234 |
| 5,208,631 | A |   | 5/1993  | Jacobs et al. |
| 5,481,655 | A |   | 1/1996  | Jacobs |
| 5,610,635 | A |   | 3/1997  | Murray et al. |
| 5,837,042 | A | * | 11/1998 | Lent et al. ................. 106/31.14 |
| 5,930,553 | A |   | 7/1999  | Hirst et al. |
| 6,019,461 | A |   | 2/2000  | Yoshimura et al. |
| 6,837,562 | B2 |  | 1/2005  | Nunokawa |
| 6,938,984 | B2 |  | 9/2005  | German et al. |
| 2002/0022990 | A1 | | 2/2002 | Kurata et al. |
| 2002/0063760 | A1 | | 5/2002 | Dietl et al. |
| 2002/0149785 | A1 | * | 10/2002 | Chu et al. ................. 358/1.9 |
| 2003/0011814 | A1 | | 1/2003 | Nunokawa et al. |
| 2003/0025939 | A1 | | 2/2003 | Jeran et al. |
| 2005/0141017 | A1 | | 6/2005 | Matsumura |

\* cited by examiner

*Primary Examiner*—Edward L Coles
*Assistant Examiner*—Charlotte M Baker

(57) ABSTRACT

A method for printing with a custom colorant material stored in a container having a memory storage element is disclosed. The memory storage element includes information related to the custom colorant material. In the method, the information is received from the memory storage element. A custom color table is implemented, and the custom color table is employed during printing of the custom colorant material.

26 Claims, 2 Drawing Sheets

PRINTING WITH CUSTOM COLORANT MATERIALS

CROSS REFERENCE TO RELATED APPLICATION

This application is a continuation of U.S. patent application Ser. No. 10/175,878, filed Jun. 21, 2002, now U.S. Pat. No. 7,259,890 which is incorporated herein by reference in its entirety.

BACKGROUND

The present disclosure relates generally to printing devices. More specifically, the present disclosure pertains to techniques of printing with one or more cartridges containing custom colorant material.

Conventional printing devices, e.g., inkjet and laser printers, photocopiers, facsimile machines, etc., typically implement a best-fit four color printing process in which cyan, magenta, yellow and black colored recording materials, e.g., ink, toner, etc., are combined in an attempt to obtain a desired color. It has been found that the best-fit four color printing process, while suitable for a great number of printing applications, may be unable to produce certain colors with suitable accuracy.

As an example, when an entity, e.g., person, business, corporation, etc., possesses a logo that includes a color that the best-fit color matching process is unable to match in a substantially adequate manner, the only option may be for the entity to rely on an outside printing vendor to print the logo in the desired color.

Reliance upon an outside printing vendor to print the logo on various media, e.g., letterhead, business cards, etc., may result in certain drawbacks and disadvantages. In one respect, the entity may need to order substantially large quantities of the various media to ensure that an adequate supply is readily available. One result of maintaining substantially large quantities of the various media is that large portions of the supply may be discarded, for example, if the letterhead changes, if an employee leaves the company, etc. In addition, the costs involved in purchasing the various media from a printing vendor may be relatively high.

It is generally known to include e-labels on cartridges, e.g., inkjet, toner, etc. E-labels may generally be defined as a memory storage element, e.g., EEPROM, PROM, radio frequency identification tags, etc., and may contain information related to the identity of the ink contained in the cartridge, e.g., ink type, color, date of manufacture, and the like. The information may be retrieved by, for example, a printing device controller.

SUMMARY

In accordance with one embodiment, the present disclosure relates to a method for printing with a custom colorant material stored in a container having a memory storage element. The memory storage element includes information related to the custom colorant material. In the method, the information is received from the memory storage element. A custom color table is implemented, and the custom color table is employed during printing of the custom colorant material.

In accordance with another embodiment, the present disclosure pertains to a system for printing with custom printing colorant. The system includes a container including the custom colorant material and a memory storage element containing information related to the custom colorant material. The system also includes a controller operable to receive the information related to the custom colorant material. In addition, the controller is operable to employ a custom color table in response to the received information.

According to yet another embodiment, the present disclosure relates to a computer readable storage medium on which is embedded one or more computer programs. The one or more computer programs implement a method for printing with a custom colorant material stored in a container having a memory storage element. The memory storage element includes information related to the custom colorant material. The one or more computer programs include a set of instructions for retrieving said information from said memory storage element; implementing a custom color table; and employing said custom color table during printing of said custom colorant material.

In accordance with a further embodiment, the present disclosure relates to a device for printing with custom colorant material. The device includes means for supporting a custom colorant material; means for storing information associated with the custom colorant material; means for retrieving said information associated with the custom colorant material; and means for employing a custom color table associated with the information.

BRIEF DESCRIPTION OF THE DRAWINGS

Features and aspects of the present disclosure will become apparent to those skilled in the art from the following description with reference to the drawings, in which.

DETAILED DESCRIPTION

For simplicity and illustrative purposes, the principles of the present disclosure are described by referring mainly to exemplary embodiments thereof. In the following description, numerous specific details are set forth in order to provide a thorough understanding of the embodiments disclosed herein. It will be apparent however, to one of ordinary skill in the art, that the embodiments disclosed herein may be practiced without limitation to these specific details. In other instances, well known methods and structure have not been described in detail so as not to unnecessarily obscure the present disclosure.

According to an embodiment of the present disclosure, a printing device, e.g., laser printer, inkjet printer, plotter, photocopier, facsimile machine, etc., may be configured to accept and implement cartridges containing custom colorant materials. The terms "custom color", as used throughout the present disclosure, may generally refer to colors that differ from the standard cyan (C), magenta (M), yellow (Y), and black (K) often implemented in conventional printing devices. For example, a custom color may include "HP"—blue, "XEROX"—red, "PACKERS"—green, etc.

The printing device may be configured to automatically retrieve information pertaining to the custom colorant material upon detection of the custom color cartridge. In addition, the printing device may also be configured to automatically regenerate and/or retrieve a custom color table to be implemented in response to the received information pertaining to the custom colorant material. In this respect, for example, a user need not manually input the information related to the custom colorant material. Instead, the printing device may automatically make adjustments to the printing scheme to accommodate for changes in the recording materials to be applied onto a print medium, e.g., color of ink/toner, type of material, etc.

Figure 1:
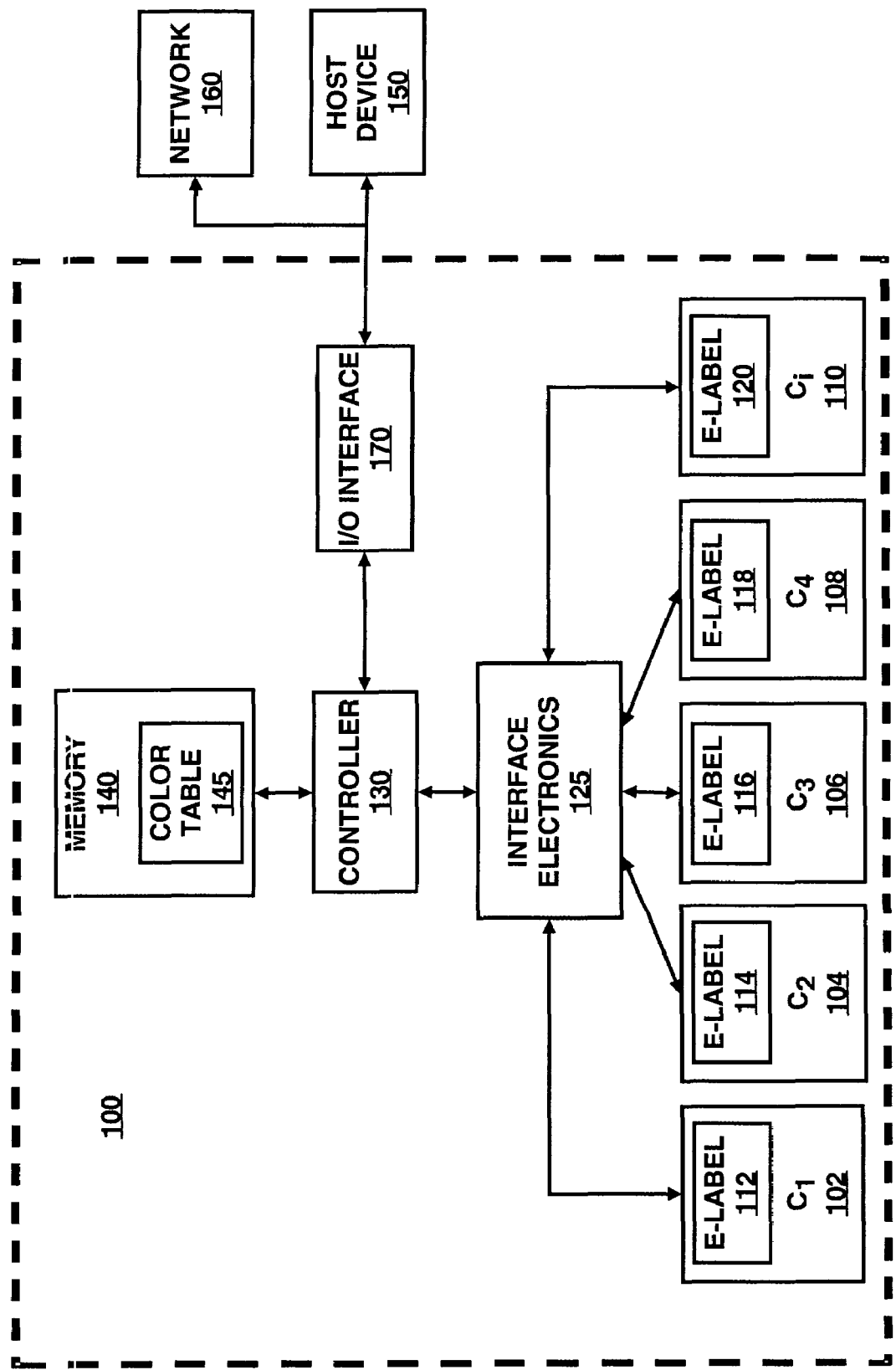
FIG. 1 illustrates an exemplary block diagram of an embodiment of a printing device.

In FIG. 1, there is illustrated an exemplary block diagram of a printing device 100 in accordance with an embodiment of the present disclosure. As will become better understood from a reading of present disclosure, the following description of the block diagram illustrates one manner in which the printing device 100 may be operated in accordance with an embodiment of the present disclosure. In this respect, it is to be understood that the following description of FIG. 1 is but one manner of a variety of different manners in which such a printing device 100 may be operated.

Generally speaking, the printing device 100 includes a plurality of cartridges 102-108 and a custom cartridge 110. The cartridges 102-108 ($C_1$-$C_4$) generally refer to cartridges containing recording material having CMYK colors. The custom cartridge 110 ($C_i$) generally refers to a cartridge containing a non-CMYK colorant material. Non-CMYK colorant material may be defined as stated above and may also be defined as a recording material that has a non-standard color, e.g., those colored materials that are not relatively mass-produced. For example, non-CMYK colorant materials may thus include those recording materials having colors that may be intended for individual uses, e.g., the blue color employed in HEWLETT PACKARD's logo. In addition, non-CMYK colorant materials may also include non-visible colorants such as those that may be implemented for purposes of authentication or security. Non-visible colorants may include colorants that may be visible through use of special lights or viewing devices, e.g., infrared (IR), ultra-violet (UV), and the like colorants.

Each of the cartridges 102-110 ($C_1$-$C_4$, $C_i$) contains a respective e-label 112-120. As described above, each e-label may generally be defined as a memory storage element, e.g., EEPROM, PROM, etc., and may contain information related to the identity of the ink contained in the respective cartridges 102-110 ($C_1$-$C_4$, $C_i$), e.g., ink type, color, date of manufacture, and the like.

Although FIG. 1 illustrates the printing device 100 as including four CMYK cartridges 102-108 ($C_1$-$C_4$) and one custom cartridge 110 ($C_i$), the printing device 100 may include any reasonably suitable number of cartridges and custom cartridges without deviating from the scope and spirit of the present disclosure. Therefore, the illustration and description of the cartridges 102-110 are for purposes of simplicity and are not meant as limitations.

According to an embodiment of the present disclosure, the printing device 100 may include a printing location (not shown) over which the cartridges 102-110 ($C_1$-$C_4$, $C_i$) are supported. As an example, in a laser printer, the cartridges 102-110 ($C_1$-$C_4$, $C_i$) may be maintained in a substantially static location. In this embodiment, the printing location may include an extra location designed to receive the custom cartridge 110 ($C_i$). As another example, in an ink jet printer, the cartridges 102-110 ($C_1$-$C_4$, $C_i$) may be supported on a movable carriage (not shown). In this embodiment, the carriage may include an extra slot designed to receive the custom cartridge 110 ($C_i$). In accordance with either embodiment, the extra location designed to receive the custom cartridge 110 ($C_i$) may be fabricated according to any reasonably suitable manner generally known to those skilled in the art to create such an extra location.

Alternatively, one or more of the locations designed to receive the CMYK cartridges 102-108 ($C_1$-$C_4$) may be used to receive the custom cartridge 110 ($C_i$), i.e., one or more of the CMYK cartridges may be replaced with one or more custom cartridges.

The printing device 100 may include interface electronics 125. The interface electronics 125 may be configured to provide an interface between a printing device controller 130 and the components for operating the cartridges 102-110 ($C_1$-$C_4$, $C_i$), e.g., toner application, a carriage (e.g., in an inkjet printer), belt and pulley system (not shown), etc. The interface electronics 125 may include, for example, circuits for moving the movable carriage (e.g., ink jet printer), moving the medium, and the like. The interface electronics 125 may also include, for example, a device for conveying information related to the recording material contained in each of the cartridges 102-110 ($C_1$-$C_4$, $C_i$) to the controller 130. The information contained in each of the e-labels 112-120 may be read by the printing device controller 130 upon start-up or servicing of the consumables. For example, in the data contained in the e-labels 112-120, there may be a custom bit that indicates that the consumable being queried is a custom colorant. If the bit is set, then further information can be read from the memory of each e-label 112-120 indicating the nature of the custom colorant (e.g., spectral values, pantone numbers, a custom color number specific to the user, etc.)

The controller 130 may be configured to provide control logic for the printing device 100, which provides the functionality for the printing device 100. In one form, the controller 130 may be implemented by the microprocessor as mentioned above. In various other forms, a microcontroller, an application specific integrated circuit, and the like, may be implemented by the controller 130.

The controller 130 may be interfaced with a memory 140 configured to provide storage of a computer software that provides the functionality of the printing device 100 and may be executed by the controller 130. The memory 140 may also be configured to provide a temporary storage area for data/file received by the printing device 100 from, for example, a host device 150, e.g., a computer, laptop computer, scanning apparatus (e.g., photocopier, facsimile machine, etc.), personal digital assistant (PDA), and the like, a network 160 (e.g., Internet, communication network, and the like), etc. The memory 140 may be implemented as a volatile memory, nonvolatile memory, or a combination thereof, such as dynamic random access memory ("RAM"), EEPROM, flash memory, and the like.

The host device 150 may include any number of peripheral devices, e.g., modem, sound card, video card, etc. In addition, the host device 150 may include a wireless communication device (not shown) that enables wireless communication.

The controller 130 may further be interfaced with an interface 170 configured to provide a communication channel between the host device 150 and/or the network 160 and the printing device 100. The interface 170 may conform to protocols such as RS-232, parallel, small computer system interface, universal serial bus, etc.

The printing device 100 may be physically attached to the host device 150 and/or the network 160 via a communication line (not shown). Alternatively, the printing device 100 may be wirelessly coupled to the host 150 and/or the network 160. More specifically, the printing device 100 may include a wireless communication device (not shown) that enables communication with the wireless communication device disposed in the host device 150 and/or the network 160. In addition, the host device 150 and/or the network 160 and the printing device 100 may communicate using a wireless communication protocol such as BLUETOOTH.

The printing device 100 may include any number of components not specifically illustrated in FIG. 1. For example, the printing device 100 may contain a graphical user interface, control panel, service station, etc.

The controller 130 may be configured to execute a set of software programs stored in the memory 140. These programs include, for example, referencing color tables 145 during conversion of images displayed on a screen (e.g., from the host device 150) into commands the controller 130 may implement to print the selected image onto a recording medium, e.g., PCL, PDF, PostScript, etc. The various manners by which a controller 130 may implement color tables 145 stored in the memory 140 to convert colors from red, green and blue (e.g., the colors displayed on a computer monitor) to the printed colors CMYK are generally well known. For example, a look up table configured to output C,M,Y,K values for a given R,G,B triplet.

In one form, the controller 130 may further be configured to execute a set of software programs designed to regenerate the color tables 145. The controller 130 may employ the information received from the e-label 120 of the custom cartridge 110 ($C_i$) to regenerate the color tables 145. By way of example, the e-label 120 ($C_i$), may contain information pertaining to the properties of toner contained in the custom cartridge 110 ($C_i$). In this example, the controller 130 may dynamically adjust the half tones of the recording material to increase the range of half-tones available for printing. For instance, the spectral curves of the colorants used may be implemented to regenerate the color tables using color science pertaining to color mixing.

In another form, the controller 130 may access a web address that contains color tables via the network 160, or other remote storage site (e.g., Internet). By way of example, the e-label, e.g., 120, may have an Internet address stored therein configured to direct the controller to download the color tables from a remotely located host. Once this data is downloaded it may be stored in a non-volatile memory of the controller 130. In this respect, the amount of memory on the e-labels 112-120 may be relatively decreased by omitting the requirement that the color tables be stored on the e-labels 112-120.

In yet another form, the e-label may store information pertaining specifically to the specific custom cartridge 110 ($C_i$). In this respect, a unique identifier for the custom colorant material in the custom cartridge 110 ($C_i$) may be employed such that the printing device 100 only operates the custom cartridge ($C_i$) in those instances where the unique identifier is activated.

The information contained in the e-label 120 of the custom cartridge 110 ($C_i$) may automatically be retrieved by the controller 130 when the custom cartridge 110 ($C_i$) is received for use by the printing device 100. The information retrieved by the controller 130 may be related to the identity of the ink contained in the custom cartridge 110 ($C_i$), e.g., ink type, color, date of manufacture, spectral values, pantone numbers, a custom color number specific to the user, and the like.

In addition, information retrieved from the remaining e-labels, e.g., e-labels 102-108, may also be employed for the regeneration of the color tables 145.

The software programs may be implemented to enable communication between the printing device 100 and the host device 150 and/or the network 160. The software programs may further enable the printing of documents supplied to the printing device 100 by the host device 150 stored in the memory 140.

Figure 2:
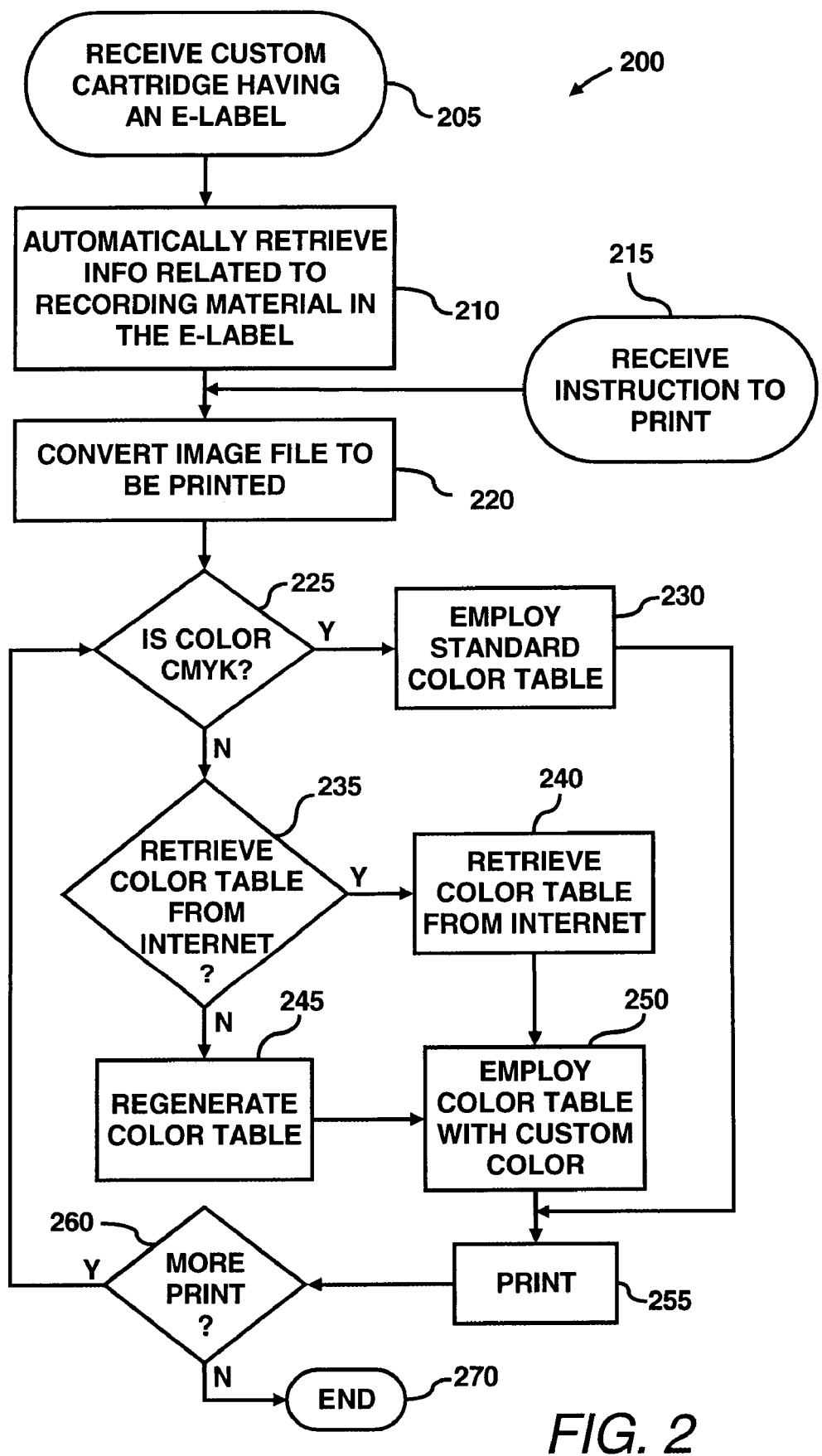
FIG. 2 illustrates an exemplary flow diagram of an embodiment of the method.

Referring to FIG. 2, there is illustrated an exemplary flow diagram of a method 200 according to a preferred embodiment of the present disclosure. The steps illustrated in the method 200 may be contained as a utility, program, subprogram, in any desired computer accessible medium. In addition, the method 200 may be embodied by a computer program, which can exist in a variety of forms, both active and inactive. For example, the method 200 may exist as software program(s) comprised of program instructions in source code, object code, executable code or other formats. Any of the above can be embodied on a computer readable medium, which includes storage devices and signals, in compressed or uncompressed form.

Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. Although particular reference is made in the following descriptions of FIG. 2 to the controller 130 as performing certain printing device functions, it is to be understood that those functions may be performed by any electronic device capable of executing the above-described functions.

Referring to both FIGS. 1 and 2, according to an embodiment of the present disclosure, the printing device 100 may receive a custom cartridge 110 having an e-label 120 (step 205). As stated above, the custom cartridge 110 may replace one of the existing cartridges or may be received in an extra slot configured to receive the custom cartridge.

The controller 130 may automatically detect the custom cartridge and access the e-label (step 210), e.g., in a manner similar to known plug and play systems. For instance, the e-labels 112-120 may be read at power-up and after any change is made to the consumables (e.g., printheads, ink supplies, etc.). As described above, the e-label 120 may include information pertaining to the recording material contained in the custom cartridge. The information may include, for example, the recording material color, recording material type, and the like. In addition, the information may also pertain to the color table employable for the recording material contained in the custom cartridge.

The printing device 100 may receive a file to print an image, e.g., text, figure, lines, etc. (step 215). The image file may be received from one or more of the host devices 150 described hereinabove.

The controller 130 may then convert the image file to a print file (step 220), e.g., rasterize the image file. The image file may be converted into a print file through any reasonably suitable manner known to those skilled in the art, e.g., PCL, PDP, PostScript, etc. A result of the conversion is that the controller 130 may determine the manner in which the image contained in the image file is to be applied on a recording medium, e.g., paper, fabric, textile, etc. As an example, based upon the converted file, the controller 130 may control the application of variously colored recording materials onto the recording medium to generally reproduce the image contained in the image file on the recording medium.

At step 225, the controller 130 may determine whether the printed image requires the application of recording materials having colors other than CMYK. In one form, the controller 130 may determine whether the custom cartridge 110 contains a recording material having a color that matches one or more of the colors of the image to be printed. That is, the controller 130 may determine whether the recording material contained in the custom cartridge 110 is suitable for use in the printed image.

If it is determined that the printed image does not require the use of the custom cartridge 110, the controller 130 may employ a standard color table 145 stored, for example, in the memory 140 of the printing device 100 (step 230).

Alternatively, the controller 130 may employ a custom color table suitable for use with the custom recording material (step 245). In one form, the custom color table may be formed from a regeneration of the color table 145 stored in memory 140 (step 245). In another form, the custom color table may be downloaded from the network 160, e.g., the Internet (step 240). Both of the above forms have been described hereinabove.

What has been described and illustrated herein is a preferred embodiment with some of its variations. The terms, descriptions and figures used herein are set forth by way of illustration, and are not meant as limitations. Those skilled in the art will recognize that many variations are possible within the spirit and scope of the invention, which is intended to be defined by the following claims—and their equivalents—in which all terms are meant in their broadest reasonable sense unless otherwise indicated.

What is claimed is:

1. A method for printing with a custom colorant material stored in a container having a memory storage element, said memory storage element including information related to said custom colorant material, said method comprising:
    retrieving said information from said memory storage element;
    implementing a custom color table including colors with spectral characteristics other than spectral characteristics of originally implemented printing device colors in response to said information retrieved from said memory storage element; and
    employing said custom color table during printing of said custom colorant material;
    wherein images printed with the custom colorant material according to the custom color table include at least one custom color with spectral characteristics other than the spectral characteristics of the originally implemented printing device colors.

2. The method of claim 1, wherein said information retrieving step comprises automatically retrieving said information in response to detection of said container.

3. The method of claim 1, wherein said information retrieving step comprises retrieving information related to the color of said custom colorant material.

4. The method of claim 1, wherein said custom color table implementing step comprises modifying a standard color table to be suitable during said printing of said custom colorant material.

5. The method of claim 4, wherein said custom color table implementing step further comprises regenerating said standard color table to form said custom color table.

6. The method of claim 4, wherein said custom color table implementing step comprises retrieving said custom color table from a remote storage site.

7. The method of claim 1, further comprising:
    receiving a file to print; and
    converting said file into a format suitable for printing.

8. The method of claim 7, further comprising employing a standard color table in response to said custom colorant material being printed as a color that is substantially similar to one of cyan, magenta, yellow, or black.

9. The method of claim 1 wherein said custom colorant material includes at least one of an infrared colorant or an ultra-violet colorant, and wherein said custom colorant material is configured to provide at least one of authentication or security.

10. A system for printing with custom colorant material, said system comprising:
    a container including said custom colorant material and a memory storage element containing information related to said custom colorant material; and
    a controller operable to receive said information related to said custom colorant material;
    wherein said controller is operable to employ a custom color table including colors with spectral characteristics other than spectral characteristics of originally implemented printing device colors in response to said received information;
    wherein images printed with the custom colorant material according to the custom color table include at least one custom color with spectral characteristics other than the spectral characteristics of originally implemented printing device colors.

11. The system of claim 10, wherein said custom colorant material container is configured to be placed at a cartridge-receiving location configured to replaceably receive either said custom colorant material container or a cartridge containing a standard colorant material.

12. The system of claim 10, wherein said container is configured to be placed at a cartridge-receiving location separate from a cartridge-receiving location configured to receive a cartridge containing a standard colorant material.

13. The system of claim 10, wherein said controller is operable to regenerate a color table based upon the color of said custom colorant material to form said custom color table.

14. The system of claim 10, wherein said controller is operable to retrieve said custom color table from a remote storage site.

15. The system of claim 10, wherein said controller is operable to automatically retrieve said information from said memory storage element upon detection of said container including said custom colorant material.

16. The system of claim 15, wherein said controller is operable to automatically employ said custom color table upon retrieval of said information from said memory storage element.

17. The system of claim 10 wherein said custom colorant material includes at least one of an infrared colorant or an ultra-violet colorant, and wherein said custom colorant material is configured to provide at least one of authentication or security.

18. A computer readable storage medium on which is embedded one or more computer programs, said one or more computer programs implementing a method for printing with a custom colorant material stored in a container having a memory storage element, said memory storage element including information related to said custom colorant material, said one or more computer programs comprising a set of instructions for:
    retrieving said information from said memory storage element;
    implementing a custom color table including colors with spectral characteristics other than spectral characteristics of originally implemented printing device colors in response to said information retrieved from said memory storage element; and employing said custom color table during printing of said custom colorant material;

wherein images printed with the custom colorant material according to the custom color table include at least one custom color with spectral characteristics other than the spectral characteristics of the originally implemented printing device colors.

19. The computer readable storage medium of claim 18, said one or more computer programs further comprising a set of instructions for automatically retrieving said information in response to detection of said container being inserted into a printing device.

20. The computer readable storage medium of claim 18, said one or more computer programs further comprising a set of instructions for modifying a standard color table to be suitable during said printing of said custom colorant material.

21. The computer readable storage medium of claim 20, said one or more computer programs further comprising a set of instructions for regenerating said standard color table to form said custom color table.

22. The computer readable storage medium of claim 20, said one or more computer programs further comprising a set of instructions for retrieving said custom color table from a remote storage site.

23. A device for printing with custom colorant material, said device comprising:

means for storing information associated with said custom colorant material;

means, containing the storing means, for supporting said custom colorant material;

means for retrieving said information associated with said custom colorant material;

means for implementing a custom color table including colors with spectral characteristics other than spectral characteristics of originally implemented printing device colors in response to the information retrieved from the storing means; and means for employing the custom color table during printing of said custom colorant material;

wherein images printed with the custom colorant material according to the custom color table include at least one custom color with spectral characteristics other than the spectral characterics of the originally implemented printing device colors.

24. The device according to claim 23, further comprising means for modifying said custom color table from a standard color table.

25. The device according to claim 23, further comprising means for modifying said means for applying said custom colorant material.

26. The device of claim 23 wherein said custom colorant material includes at least one of an infrared colorant or an ultra-violet colorant, and wherein said custom colorant material is configured to provide at least one of authentication or security.

* * * * *

UNITED STATES PATENT AND TRADEMARK OFFICE
CERTIFICATE OF CORRECTION

| | | |
|---|---|---|
| PATENT NO. | : 7,551,321 B2 | Page 1 of 1 |
| APPLICATION NO. | : 11/773100 | |
| DATED | : June 23, 2009 | |
| INVENTOR(S) | : Paul L. Jeran | |

It is certified that error appears in the above-identified patent and that said Letters Patent is hereby corrected as shown below:

In column 10, line 15, in Claim 23, delete "characerics" and insert --characteristics--, therefor.

Signed and Sealed this

Thirty-first Day of August, 2010

David J. Kappos
*Director of the United States Patent and Trademark Office*